May 11, 1965 W. S. LEE 3,182,713
COMBINATION PRESSURE-TEMPERATURE CONTROL AND VALVE
Filed June 29, 1962
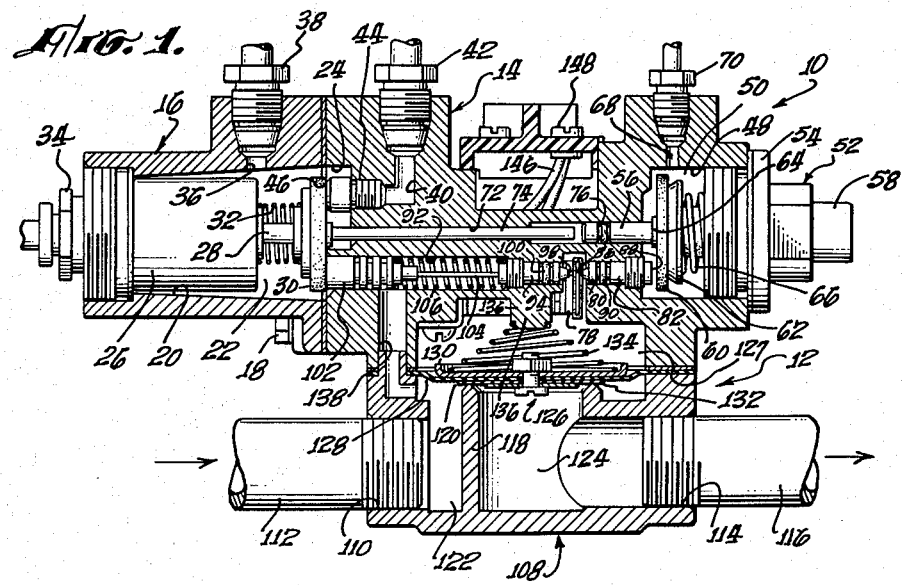
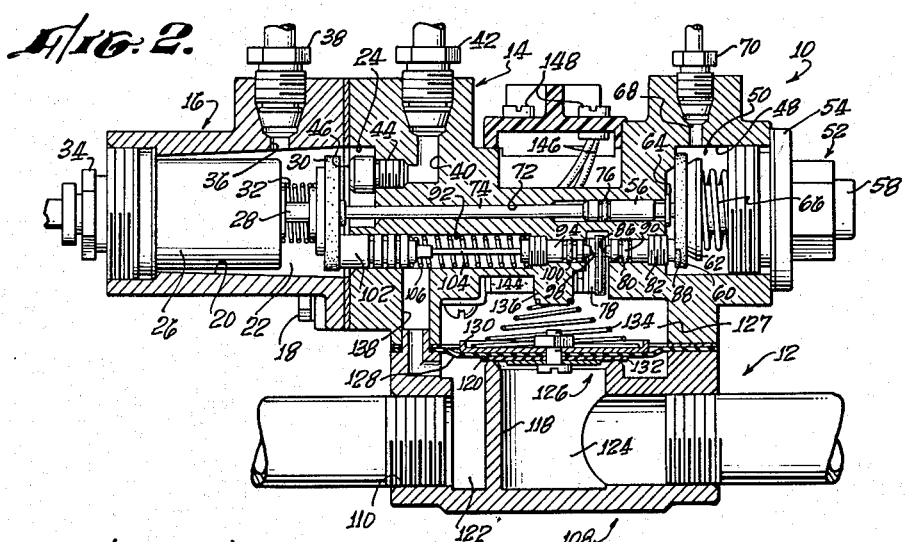
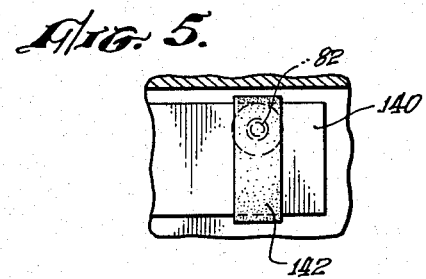
WALTER S. LEE,
INVENTOR.
BY HIS ATTORNEYS.
HARRIS, KIECH, RUSSELL & KERN.

May 11, 1965  W. S. LEE  3,182,713
COMBINATION PRESSURE-TEMPERATURE CONTROL AND VALVE
Filed June 29, 1962  3 Sheets-Sheet 2
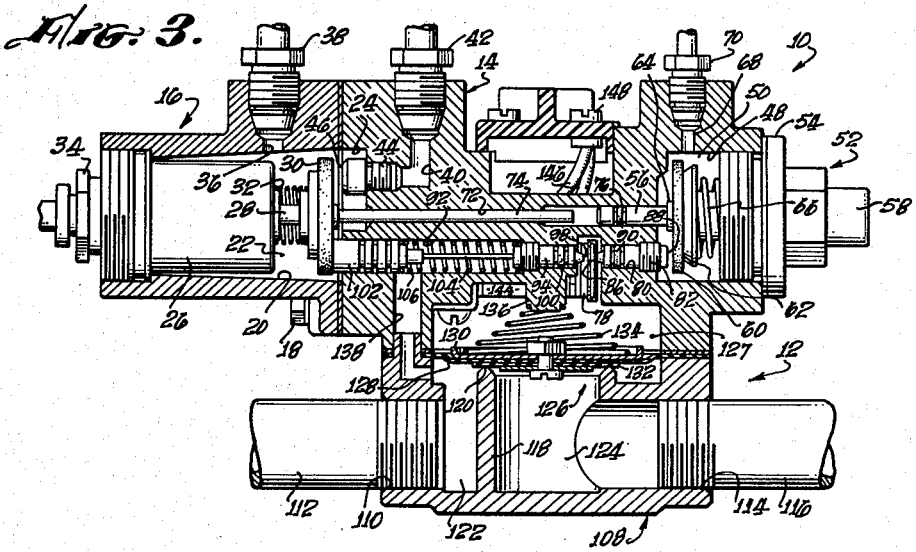
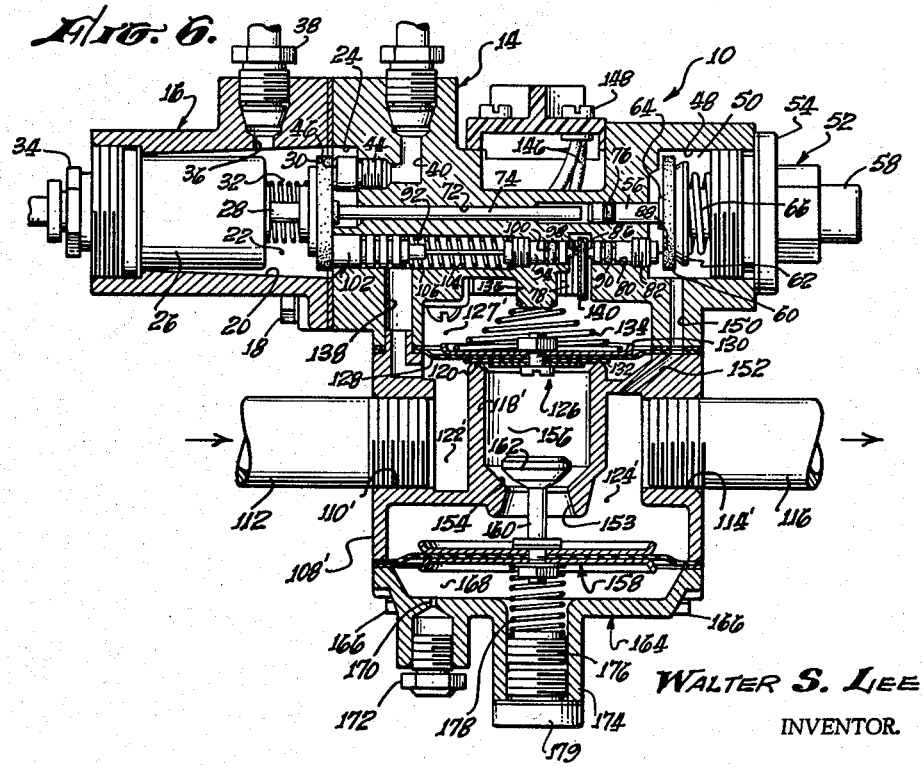
WALTER S. LEE,
INVENTOR.
BY HIS ATTORNEYS.
HARRIS, KIECH, RUSSELL & KERN.

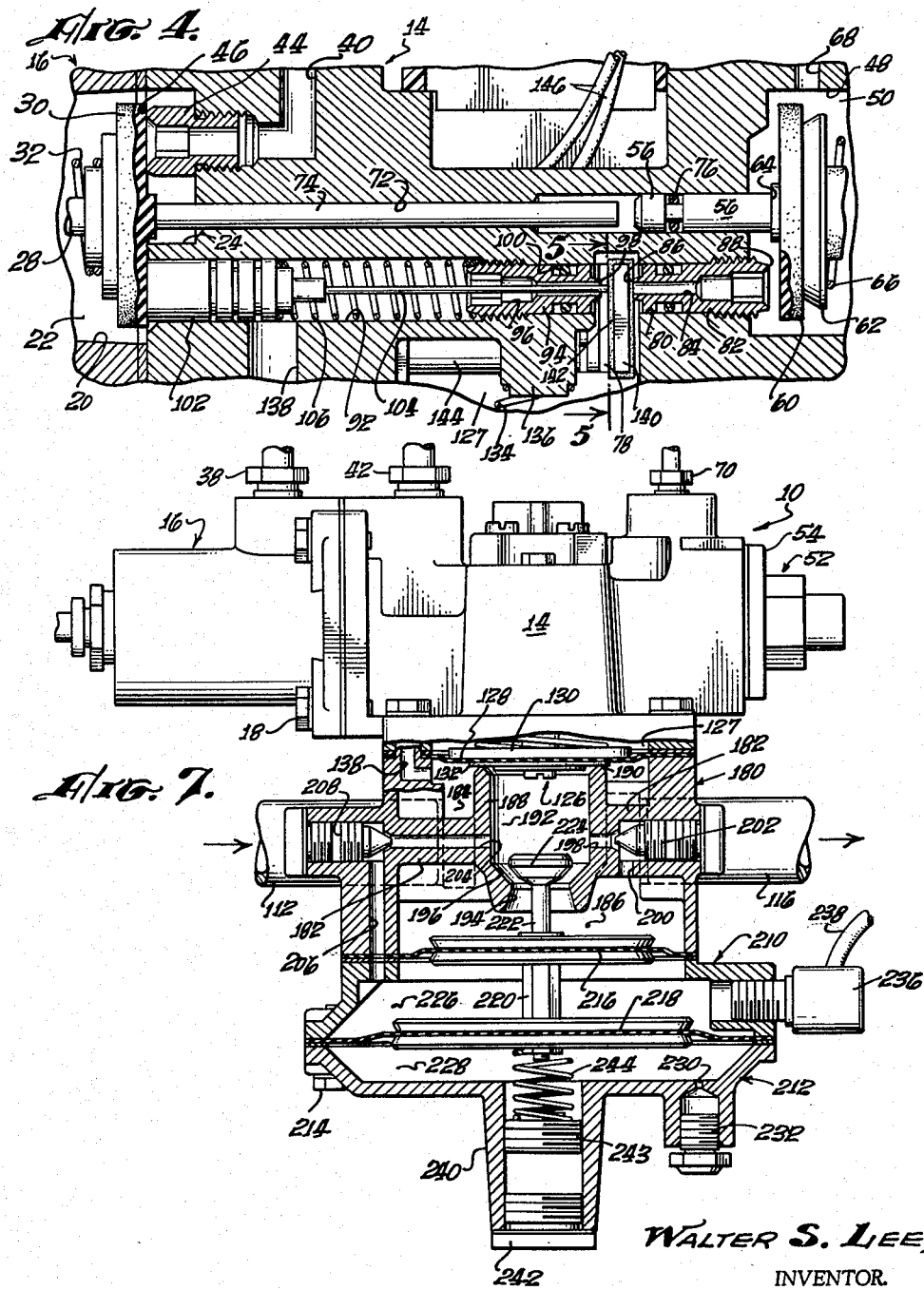

United States Patent Office 3,182,713
Patented May 11, 1965

3,182,713
COMBINATION PRESSURE-TEMPERATURE
CONTROL AND VALVE
Walter S. Lee, P.O. Box 537, Corona, Calif.
Filed June 29, 1962, Ser. No. 206,382
18 Claims. (Cl. 158—129)

The present invention relates generally to the valve art and more particularly to a novel combination pressure-temperature control and valve for use with gas burners and the like which include a main burner and a pilot burner.

Briefly stated, one embodiment of the control portion of the combination as used with a simple diaphragm-type valve includes one passageway between the inlet chamber of the valve and the exhaust chamber thereof terminating in a first valve seat at the exhaust chamber, and another passageway between the bleed chamber in the control and the exhaust chamber terminating in a second valve seat at the exhaust chamber and a third valve seat at the bleed chamber.

An armature valve member is provided, movable between the first and second valve seats to close off either of the passageways leading to the exhaust chamber, the armature being responsive to the temperature in the room being controlled.

A bleed valve is provided in the bleed chamber for engagement with the third valve seat and is biased toward the open position.

A pilot chamber in the control, which has both an inlet and an outlet with the latter providing a valve seat, contains a pilot valve which is biased toward a closed position on said valve seat.

A control button is provided for moving the bleed valve to the closed position and there is a delayed action linkage associated with the button to move the pilot valve to the open position only after the bleed valve has been moved to the closed position.

And, means are provided between the pilot valve and the armature valve member so that the latter is maintained on (or moved to) the second valve seat when the pilot valve is closed, thereby preventing the flow of gas to the main burner when the pilot burner is extinguished.

This same control can also be used with a diaphragm-type valve which includes pressure regulator means and which can also include a modulator chamber which has the gas vented therefrom responsive to a temperature sensitive means separate and apart from the room thermostat.

As is well known, the valve control field is a relatively crowded one and there are many different types of controls and valves for use with gas burners and the like. However, many of the known constructions are unsatisfactory for one reason or another. Thus, some of the devices do not control the flow of gas properly in response to the demand for heat, others fail through malfunctions, while still others are so limited in their application as to be impractical from an economical standpoint.

It is an object of the present invention, therefore, to provide a novel combination pressure-temperature control and valve which is extremely rugged in construction and reliable in operation. More particularly, it is an object to provide such a combination control and valve for use with furnaces and the like containing a main burner and a pilot burner, which permits the ignition of the pilot burner while preventing the flow of gas to the main burner, regardless of the demand for heat. More specifically, it is an object to provide such a device which prevents the flow of gas to the main burner before the pilot burner is ignited and the operator has released the mechanical control which permitted the pilot burner to be ignited.

Another object is to provide such a novel combination control and valve wherein the main valve is maintained in a closed position when there is no demand for heat, regardless of physical orientation of the device. More particularly, it is an object to provide such a control and valve combination which includes a main diaphragm valve which is maintained in the closed position by inlet gas pressure and spring pressure when there is no demand for heat, but which includes means for quickly and safely venting the gas from the closing side of the diaphragm when there is demand for heat and the control is in the open or energized position.

A further object is to provide such a novel combination control and valve for gas burners and the like which includes means for maintaining the pressure of the gas in the outlet line below a predetermined value. More particularly, it is an object to provide a pressure regulating means as an integral part of the diaphragm valve body proper.

Yet another object is to provide a novel combination control and valve which includes means for automatically throttling the flow of gas to the main burner responsive to changes in temperature in an enclosure separate and apart from the room being heated. More particularly, it is an object to provide such a device which automatically throttles or modulates the flow of gas to the main burner responsive to the temperature of the air in the cold air return duct so as to prevent the temperature in the room from "hunting" or "over-riding" the room control. The control may also be actuated by the use of a room thermostat to electrically control the modulative valve section, thus providing a combination control to provide full modulation either mechanically or in combination mechanically and electrically.

Another object is to provide a novel combination control and valve which includes means for preventing the main burner from becoming extinguished while there is a minimum demand for heat. More particularly, it is an object to provide such a control and valve which includes means for providing a minimum flow of gas to the main burner at all times when there is a demand for heat so that there will be no "back-firing" in the outlet conduit, as often occurs when there is a low firing rate on the burner with the possibility of flashback in the burner and gas carrying conduit.

An additional object is to provide a novel universal type of pressure-temperature control which can be used with all types of valves having a main diaphragm valve. More particularly, it is an object to provide such a control which can be used with simple diaphragm valves, with diaphragm valves having pressure-regulating means, and with diaphragm valves which include both pressure-regulating means and flow-modulating means.

Further objects and advantages of the present invention will be apparent from the following detailed description, reference being had to the accompanying drawings wherein preferred embodiments of the present invention are shown.

In the drawings:

FIG. 1 is a vertical sectional view of a combination pressure-temperature control embodying the teachings of the present invention, used in combination with a simple diaphragm valve, the control being shown in the "off" position prior to placing the device in operation;

FIG. 2 is a vertical sectional view similar to FIG. 1, showing the position of the parts when the control has been manually moved to the "pilot light" position;

FIG. 3 is a vertical sectional view similar to FIGS. 1 and 2, showing the position of the parts when the control is in the "on" position whereby gas can flow to the main burner upon demand therefor;

FIG. 4 is an enlarged, fragmentary, vertical sectional view of a portion of the control shown in FIG. 1;

FIG. 5 is a vertical sectional view taken on the line 5—5 in FIG. 4;

FIG. 6 is a vertical sectional view of a slightly modified control with internal bleed shown in combination with a diaphragm valve containing pressure-regulating means, the control being shown in the "off" position; and FIG. 7 is an elevational view, partially in section, showing the control in combination with a diaphragm valve which includes both pressure-regulating means and flow-modulating means.

Referring to the drawings more particularly by reference numerals, specifically FIGS. 1 through 5, 10 indicates generally a novel combination pressure-temperature control constructed in accordance with the teachings of the present invention, used in combination with a simple diaphragm-type valve 12.

The control includes a main housing 14 and an auxiliary housing 16 removably fastened thereto as with machine screws 18, the auxiliary housing containing a horizontally extending passageway 20 therethrough, the inner end of the passageway forming a pilot chamber 22 with a recess 24 contained in the main housing 14.

The outer end of the passageway 20 is threaded to receive a thermo-electric power unit 26 which includes a reciprocating shaft 28 having a rubber disc-like valve member 30 mounted on the end thereof, a spring 32 being positioned around the shaft to urge the valve member away from the actuator 26. The outer end of the power unit 26 is provided with an inward fitting 34 which normally receives a conduit containing a wire connected to a thermocouple positioned adjacent the pilot burner (not shown).

Provided in the upper portion of the auxiliary housing 16 is a pilot inlet passageway 36 in communication with the pilot chamber 22, the outer end of said passageway containing a fitting 38 which receives the end of a conduit in communication with a source of gas (not shown).

In the upper portion of the main housing 14 is a pilot outlet passageway 40 which is also adapted to be in communication with the pilot chamber 22, the outer end of said passageway being provided with a fitting 42 to receive a conduit connected to the pilot burner (not shown). The inner end of the pilot outlet passageway contains a hollow fitting 44 provided with a valve seat 46 which is adapted to receive the disc-like valve member 30.

At the right-hand end of the main housing 14 is a cylindrical recess 48, the innermost portion of which forms a bleed chamber 50. A manual control assembly 52 is threadably and removably mounted in the outer end of the cylindrical recess 48 and includes a fitting 54 which slidably receives a shaft 56 having an enlarged portion or button 58 at the outer end thereof. Slidably mounted on the shaft 56 within the bleed chamber is a valve assembly which includes a rubber disc-like valve member 60 and a back-up plate 62, both of which are urged against a shoulder 64 on the shaft 56 by a spring 66. Formed in the main housing 14 above the bleed chamber 50 is a bleed passageway 68 which is in communication with said chamber, the upper or outer end of said passageway containing a fitting 70 which receives a conduit for conveying the gas from the bleed chamber to a position adjacent the pilot burner (not shown).

Extending transversely of the main housing 14, between the pilot chamber 22 and the bleed chamber 50, is a passageway 72, one portion of which passageway slidably receives an actuating rod 74 and the other portion of which slidably receives the end of the shaft 56. An O-ring 76 is provided on the shaft 56 to prevent the passage of gas through the passageway 72 and into the bleed chamber 50. As best shown in FIG. 4, one end of the rod 74 is adapted to be contacted by the end of the shaft 56 after the valve member 60 has been moved a predetermined distance, and the other end of the rod is adapted to engage a boss at the center of the disc-like valve member 30.

The main housing 14 also contains another series of passageways below the passageway 72, which, in effect, are also between the pilot chamber 22 and the bleed chamber 50. Thus, there is an armature chamber 78 below the end of the shaft 56 (FIG. 4) and a passageway 80 between said armature chamber and the bleed chamber 50. A fitting 82 is threadably mounted in said passageway 80 and contains an opening 84 therethrough which is provided with a valve seat 86 at the armature chamber end thereof and a valve seat 88 at the bleed chamber end. An O-ring 90 is positioned about the fitting 82 to prevent the passage of gas around it.

Extending leftwardly from the armature chamber 78 toward the pilot chamber 22 is another passageway 92 which contains a fitting 94 having an opening 96 therethrough, the end of the fitting adjacent the armature chamber containing a valve seat 98. Here again, an O-ring 100 is used on the fitting 94 to prevent the passage of gas around it.

Slidably mounted in the other end of the passageway 92 is a plunger member 102, the one end of which is adapted to engage the valve member 30 and the other end receives and is fastened to a thin elongated rod 104 which extends through the opening 96 and into the armature chamber 78, as shown in FIG. 4, the rod 104 fitting loosely in the passageway 96 so that gas can flow around it. A coiled spring 106 is positioned between the fitting 94 and the plunger 102 so as to urge the latter (and the rod 104) toward the valve member 30.

Turning to a consideration of the main valve portion of the device, there is provided a valve housing 108 (FIGS. 1, 2 and 3) which is removably fastened to the lower portion of the main housing 14 as with screws (not shown) so that other types of valve housings can also be used with the subject control, as will be discussed more fully hereinafter.

The valve housing 108 includes an inlet 110 to which is connected an inlet conduit 112, as well as an outlet 114 to which is connected an outlet conduit 116. Between the inlet and outlet is a cylindrical wall 118 which has a valve seat 120 at the upper end thereof and which separates the housing into an inlet chamber 122 and an outlet chamber 124.

A diaphragm member 126 is fastened between the main housing and the valve housing so as to extend across the inlet chamber above the valve seat and provides an exhaust chamber 127 thereabove. This member includes a flexible diaphragm 128, a plate member 130, and a valve member 132 for cooperation with the valve seat 120. A coiled spring 134 is positioned between the plate member 130 and a stud 136 depending from the main housing 14 so as to urge the valve member 132 onto the valve seat 120. As will be discussed more fully hereinafter, this permits the valve control to be used in the inverted position without the main valve falling to an open position when there is in fact no demand for heat.

An equalizing passageway 138 (FIGS. 1 and 4) connects the passageway 92 with the inlet chamber 122 below the diaphragm member 126, the upper portion of the passageway 138 being formed in the main housing 14 and the lower portion thereof being formed in the valve housing 108.

Pivotally mounted in the upper portion of the inlet chamber above the diaphragm member 126 is an elongated plate-like armature member 140 (FIG. 4) which has the free end thereof positioned in the armature chamber 78. As shown in FIGS. 4 and 5, a resilient collar-like valve member 142 encircles the free end of the armature member and is adapted to seat on either of the opposed valve seats 86 and 98 so as to close off the passageways which terminate in the aforementioned valve seats.

The armature member 140 is actuated by an electromagnet or solenoid 144 which is mounted in the upper portion of the inlet chamber in back of the stud 136, and which is energized through wires 146 connected to terminals 148. In the usual installation, the terminals 148 are connected in an electrical circuit which includes a room thermostat (not shown) so that the solenoid 144 is energized in response to the closing of the contact in the room thermostat when there is a demand for heat.

In use, both the inlet conduit 112 and the tubing connected to the fitting 58 are connected to a source of fuel gas (not shown), the outlet conduit 116 is in turn connected to a main burner in a gas furnace (not shown), the tubing connected to the fitting 42 is connected to the pilot burner (not shown) in the furnace, and the bleed tubing (when external bleed is used) which is connected to the fitting 70 terminates adjacent the pilot burner so that any gas vented therethrough is ignited and burned. This operation is a "puff" bleed, only bleeding the gas in the diaphragm chamber 78.

Assuming that there is no demand for heat and that the control 10 is in the inoperative position with the main burner and pilot burner closed down, the position of the various members will be as shown in FIGS. 1 and 4, i.e., the diaphragm valve member 132 will be in engagement with the valve seat 120 because of the closing force of the spring 134 and the pressure of inlet gas supplied through passage 138 and passing through inlet orifice 98 into the upper diaphragm chamber so as to prevent the passage of any fuel gas from the inlet conduit 112 to the outlet conduit 116, the valve member 30 (FIG. 4) will be in engagement with the valve seat 46 so as to close off the pilot passageway 40, the valve member 142 (FIGS. 4 and 5) will be in engagement with the valve seat 86 so as to close off the passageway 84 and prevent the flow of gas to the bleed chamber 50, and the valve member 60 (FIG. 4) will be positioned away from the valve seat 88.

When a gas source is placed in communication with the inlet conduit 112 and the tubing connected to the pilot fitting 58, gas will flow through the fitting 58, through the passageway 36, and into the pilot chamber 22. With the valve member 30 in engagement with the valve seat 46, gas is prevented from flowing to the pilot burner. At the same time, gas will flow through the inlet conduit 112 and into the inlet chamber 122 below the diaphragm member 126, up through the equalizing passageway 138, through the passageway 92 around the rod 104 and through the passageway 96, past the valve seat 98, into the armature chamber 140, and thence into the exhaust chamber 127 above the diaphragm member 126. Because the upper area of the diaphragm member subject to the inlet pressure is greater than the area of the lower surface of the diaphragm member subject to the same gas pressure, the diaphragm valve will remain in the closed position. Obviously, the spring 134 also aids in initially maintaining the diaphragm valve in the closed position and is employed so that the device can also be mounted in an inverted position wherein the diaphragm valve member would tend to fall away from its valve seat due to the force of gravity, but for the action of the aforementioned spring.

To ignite the pilot burner, the button 58 is moved inwardly or to the left (FIG. 2) so as to seat the valve member 60 on the valve seat 88, thereby closing off the passageway 84 so as to prevent the flow of gas from the inlet chamber above the valve member 126. This traps the gas in the exhaust chamber 127 above the diaphragm assembly 126 so as to prevent the main diaphragm valve 132 in contact with the main seat 120 from opening. After the valve member 60 has been seated, further inward movement of the button 58 moves the shaft 56 to engage the actuating rod 74 and move it to the left so as to engage the valve member 30 and move it away from the valve seat 46. This permits the gas to flow from the pilot chamber 22, through the passageway 40 through the fitting 42, and to the pilot burner where the gas can be ignited as by holding a lighted match adjacent the pilot burner.

The movement of the valve member to the left also compresses the spring 32 and moves the shaft 28 to the left so that when the pilot burner is ignited and the thermocouple (not shown) adjacent thereto is heated, current will flow through the thermo-electric power unit 26 and the shaft 28 will be maintained in the retracted position. The construction and operation of the power unit 26 is well known in the art.

Thus, if the pilot burner is ignited, the valve member 30 will remain away from the valve seat 46 and gas will continue to flow to the pilot burner even after the button 58 has been released.

It will be noted that when the valve member 30 is moved to the left, this releases the plunger member 102 and the rod 104 thereby permitting them to also move to the left under the action of the spring 106. Consequently, if the room thermostat (not shown) indicates a demand for heat, the armature 140 would be free to move to the left away from the valve seat 86, which movement would normally permit the bleeding of gas from the exhaust chamber 127 above the diaphragm member 126 so as to permit the main diaphragm valve to open. However, this does not occur and therefore gas will not flow to the main burner while the pilot burner is being ignited because the valve member 60 has been moved into engagement with the valve seat 88 by the movement of button 58 thereby closing off the passageway to the bleed chamber.

However, after the button 58 has been held in the operative position for a sufficient period of time to permit the thermocouple adjacent the lighted pilot burner to energize the actuator 26 as described above, the button is released and moves to the right under spring pressure when an external bleed is used. This results in the positioning of the members as shown in FIG. 3 wherein the valve member 30 is maintained away from the valve seat 46 by the actuator 26 so as to continue to permit gas to flow from the pilot chamber 22, through the passageway 40 and to the pilot burner; the valve member 60 is moved away from the valve seat 88 by the aforementioned spring action to permit gas to flow into the bleed chamber 50 if and when the other end of the passageway 84 is opened; and the rod 104 is positioned away from the armature member 40 to permit the valve member 142 carried thereby to move freely between the valve seats 86 and 98.

As mentioned hereinabove, when there is no demand for heat in the room containing the thermostat (not shown), the armature member 140 will be in the position as shown in FIG. 3 with the valve member 142 in engagement with the valve seat 86 so as to prevent the escape of gas from the exhaust chamber 127 above the diaphragm member 126.

However, when there is a demand for heat, the solenoid 144 will be energized as mentioned above so as to move the armature to the left and the valve member 142 from the valve seat 86 to the valve seat 98. This releases or vents the gas pressure from the exhaust chamber 127 above the diaphragm member 126 and permits it to flow through the passageway 84, into the bleed chamber 50, through the passageway 68 and the fitting 70, and through the conduit to the pilot burner where it is ignited and burns. Also, when the valve member 142 engages the valve seat 98, it prevents the flow of gas from below the diaphragm member 126 through the equalizing passageway 138, thereby preventing the building up of pressure in the exhaust chamber 127 above the diaphragm member 126, as would again tend to move it toward the closed position.

This release of the gas pressure from the exhaust chamber 127 above the diaphragm member 126 permits the gas pressure beneath it to lift the valve member 132 off the valve seat 120, whereby gas flows freely from the inlet 110 to the outlet 114 and thence to the main burner (not shown) where it is ignited by the flame of the pilot burner.

Thereafter, when the demand for heat has been satisfied, the solenoid 144 will be de-energized, the armature 140 will move to the right and the valve member 142 will close off the bleed passageway 84 and open the equalizing passageways 138, 92, 96, thereby causing the gas pressure to increase again in the exhaust chamber 127 above the diaphragm member 126 and move the valve member 132 to a closed position on the valve seat 120 to stop the flow of gas to the main burner.

If the flame at the pilot burner were to be extinguished for one reason or another, the thermocouple (not shown) would cool and the power unit 26 would be de-energized, thereby causing the shaft 28 to be moved to the right under the action of the spring 32 so as to cause the valve member 30 to engage the valve seat 46 and thereby cut off the flow of gas to the pilot burner, and, at the same time move the plunger member 102 and the rod 104 to the right to hold the valve member 142 (carried by the armature member 140) on the valve seat 86 and thereby prevent the escape of gas from the exhaust chamber 127 above the diaphragm member 126 which would in turn maintain the diaphragm valve in the closed position. This would prevent the flow of gas to the main burner even if there were a demand for heat and thereby prevent an explosion as might occur if combustible gas were to be discharged into an open chamber and later accidentally ignited.

Thus, it will be noted that with the present automatic control, gas is prevented from flowing to the pilot burner or to the main burner when the pilot burner is not ignited. Also, when the button 58 is actuated to permit gas to flow to the pilot burner so that it can be initially ignited, gas is prevented from escaping from the exhaust chamber above the diaphragm even if there were a demand for heat so that the main diaphragm valve will not open and cause a rush of gas to the main burner while the pilot burner is being ignited. Furthermore, after the device has been in operation and the flame of the pilot burner becomes extinguished, either accidentally or on purpose, the valve members will seat to close off the flow of gas to the pilot burner and to prevent the escape or bleeding-off of gas from the main diaphragm member even if there were to be a demand for heat. Consequently, it is readily apparent that this automatic control is completely and fully safe under both normal and emergency operating conditions.

As mentioned hereinabove, the novel combination pressure-temperature control can also be used in combination with other types of valves without departing from its basic construction, e.g., pressure-regulator valves and valves which incorporate both a pressure regulator and a modulation control.

FIG. 6 shows substantially the same control in combination with a diaphragm valve incorporating pressure regulation means, the only difference in the control residing in an alternate position of the venting passageway in communication with the bleed chamber. Thus, in the construction first described (FIGS. 1 through 4), the passageway 68 permitted the venting of gas from the bleed chamber 50, through the fitting 70, and thence to the vicinity of the pilot burner to a pipe or tubing connected to said fitting. On the other hand, in the construction shown in FIG. 6 (wherein like numbers are used for the control portion of the assembly and similar primed numbers are used for like parts of the valve housing) a bleed passageway 150, 152 extends downwardly from the bleed chamber 50 to the outlet chamber 124' so that the gas passes to the main burner through the outlet conduit 116 instead of being discharged adjacent the pilot burner through a separate length of tubing. Otherwise, the construction and operation of the control are exactly the same.

Turning to a consideration of the valve proper, however, it will be noted that the simple diaphragm valve shown in FIGS. 1 through 4 is replaced by a two-piece diaphragm and pressure regulator valve. Thus, the valve housing 108' includes an inlet 110' and an outlet 114' to which are connected the inlet conduit 112 and the outlet conduit 116, respectively. An annular wall 118' divides the interior of the housing into an inlet chamber 122' and an outlet chamber 124', but, instead of having an outlet port in the side of the annular wall as in FIG. 1, a passageway 153 and a valve seat 154 are formed in the bottom portion thereof so as to provide communication between an intermediate outlet chamber 156 below the diaphragm member 126 and the main outlet chamber 124'.

Extending across the lower end of the valve housing 108' is a pressure regulator diaphragm member 158 which supports a stem 160 having a valve member 162 at the upper end thereof for engagement with the valve seat 154.

A bottom plate member 164 is fastened to the lower end of the valve housing 108' below the diaphragm member 158 as with screws 166 so as to provide an exhaust chamber 168 which is in communication with the atmosphere through a port 170 and a small opening contained in a threaded plug 172.

The plate member is also provided with a tubular portion 174 which is internally threaded to receive an adjusting plug 176 which supports one end of a spring 178 which has the other end thereof in engagement with the diaphragm member 158. A closure member 179 is provided at the lower end of the tubular portion 174.

In operation, when the main diaphragm member 126 is in the lowermost position so that the valve member 132 is in engagement with the valve seat 120 whereby no gas can flow between the inlet 110' and the outlet 114', there will be no gas pressure in the main outlet chamber 124' above the pressure regulator diaphragm member 158 and therefore the latter will be moved to its uppermost position by the spring 178 and the valve 162, 154 will be fully open.

When the control 10 is placed in operation as by pressing the button 58 and lighting the pilot burner, as previously described, demand for heat will cause the diaphragm assembly 126 to be lifted upwardly with the valve member 132 being moved away from the valve seat 120, thereby causing the gas to flow into the intermediate outlet chamber 156, through the passageway 153, into the main outlet chamber 124' above the pressure regulator diaphragm member 158, and thence out through the outlet 114' and into the outlet conduit 116. If the flow of gas into the main outlet chamber 124' above the diaphragm member 158 is too great, the increased pressure will force the diaphragm member 158 downwardly against the action of the spring 178 and thereby cause the valve member 162 to approach the valve seat 154 and throttle the flow of gas through the passageway 153. In this manner, the pressure of the gas flowing from the outlet 114' will be regulated and maintained below a value which is determined by the pressure exerted by the spring 178.

Another combination employing the same combination pressure-temperature control 10 is shown in FIG. 7 wherein a modulating valve and associated chamber are used with a slightly modified pressure regulator and diaphragm-type valve construction.

Thus, the same control 10 as shown in FIGS. 1 through 4 is used, said control including a diaphragm assembly 126 having a valve member 132, and a passageway 138, which, together with the other passageways 92 and 96, previously described, interconnect the chambers both above and below the diaphragm assembly 126.

A modified valve housing 180 is fastened to the lower end of the control 10 below the diaphragm assembly 126, as with screws (not shown), and includes a horizontally disposed partition 182 which divides the housing into an inlet chamber 184 and an outlet chamber 186. The partition 182 has a cup-like wall portion 188 adjacent the center thereof, the upper edge of the latter forming a valve seat 190 to receive the valve member 132 previously described, and the interior thereof forming an intermediate outlet chamber 192. The bottom of the cup-like portion contains a passage 194 and a valve seat 196.

Formed in the partition 182 to the right of the wall portion 188 is a series of passageways 198, 200 (minimum flow passageways) which interconnect the intermediate outlet chamber 192 with the main outlet chamber 186. A needle valve 202 mounted in the wall of the valve housing 180 controls the flow of gas through said minimum flow passageway. Somewhat similar series of passageways 204, 206 is contained in the partition 182 to the left of the wall portion 188 and the flow of gas therethrough is controlled by a similar needle valve 208.

Removably fastened to the lower end of the valve housing 180 as with screws (not shown) is a diaphragm housing with an upper plate member 210 and a lower plate member 212 which are fastened together as with screws 214. Thus, it will be noted that the same control 10 can be used with various types of valve assemblies which can include one or more sets of separate housings which are fastened together as with screws.

A first diaphragm assembly 216 is supported between the valve housing 108 and the upper plate member 210, and a second diaphragm assembly 218 is supported between the upper plate member 210 and the lower plate member 212, both diaphragm assemblies being interconnected by means of a rigid spacer member 220. Projecting upwardly from the first diaphragm assembly is a stem 222 which supports a valve member 224 adapted to engage the valve seat 196.

A modulation chamber 226 is formed between the first and second diaphragm assemblies, and an exhaust or atmosphere chamber 228 is formed below the second diaphragm assembly, the chamber 228 being in communication with the atmosphere through a vent passageway 230 and a plug 232 containing an opening (not shown) therethrough.

Formed in the wall of the upper plate member 210 is an outlet 234 which receives a control valve 236 which controls the flow from the modulation chamber 226 through a conduit 238 to adjacent the pilot burner (not shown), said control valve being responsive to a bulb and capillary positioned in the cold return air duct of the heating system. Thus the control valve 236 controls the flow of gas from the modulation chamber 226 responsive to the temperature of the air in the cold air return duct, as will be described more fully hereinafter. An alternate method can be employed to actuate the control valve 236, as by utilizing an electric heat type valve actuator which is controlled by the room thermostat (not shown) located in the room being heated. An internally threaded well 240 is provided in the lower plate member 212 adjacent the center thereof, the well being closed off at the bottom and by a plug 242 and containing an adjustably threaded insert 243 which supports a coiled spring 244 in engagement with the second diaphragm assembly 218.

In operation, the valve control 10 as used with the construction shown in FIG. 7 operates in substantially the same manner as previously described relative to the other valve constructions (FIGS. 1 through 6) to prevent operation of the main burner while the pilot burner is being ignited and after it has become extinguished.

Furthermore, the operation of the pressure regulator portion of the device as embodied in the first diaphragm assembly 216, and the valve 224, is the same as previously described relative to the modified construction shown in FIG. 6.

The main differences between the construction shown in FIG. 7 and the construction previously described resides in the use of a modulation chamber, together with the minimum flow passageway 198, 200 between the intermediate outlet chamber 192 and the main outlet chamber 186.

Considering first the aforementioned minimum flow passageway 198, 200, it will be noted that so long as there is demand for heat (i.e., the valve member 132 being positioned away from the valve seat 190) there will be a minimum flow of gas to the main burner from the intermediate outlet chamber 192, through the passageway 198, 200, and through the main outlet chamber 186—regardless of whether the pressure regulator valve member 224 is in the open or the close position. This assures that the main burner will remain ignited at all times when there is a demand for heat, even if the pressure regulator valve 162 is closed, thereby preventing "flash-back" in the outlet conduit 116 as may occur if the main burner became extinguished during the demand for heat as when the control valve 236 is closed so as to prevent the flow of gas through passageway 234 and conduit 238, thereby building up the pressure in the modulation chamber 226 so as to close the pressure regulating valve 224. In short, the pressure regulating valve becomes a throttle valve under the influence of the pressure in the modulation chamber 222.

The second improvement resides in the use of the modulation chamber 226 which is also in communication with the intermediate outlet chamber 192 through the passageway 204, 206, the rate of flow of gas into the modulation chamber therethrough being controlled by the needle valve 208. Accordingly, so long as the main valve 132, 190 is open, gas will flow into the modulation chamber 226 through the passageway 204, 206 where it will urge the valve 224 toward the closed position because of the difference in the areas of the diaphragm assemblies 216 and 218. Thus, the gas pressure in the modulation chamber 226 tends to close the valve 224, 196 against the action of the spring 244, and whether the gas pressure or the spring pressure prevails depends upon the rate at which the gas is vented from the chamber through the control valve 236 as compared with the rate of gas flow into the modulation chamber past the needle valve 208.

Assuming that the temperature of the air in the cold air return duct (where the temperature responsive means for the control valve 236 is located) is relatively low, the valve 236 would be wide open so that the gas would be vented from the modulation chamber 226 as fast as it entered, and therefore the spring 244 would urge the valve 224 toward the open position so that there would be a free flow of gas to the main burner.

However, when the temperature of the air in the cold air return duct increases, the valve 236 beigns to throttle the flow of gas from the modulation chamber 226 so as to begin to overcome the action of the spring 224 and thereby move the valve 224 toward the closed position. In this manner, the modulation portion of the device "anticipates" the temperature of the room being heated approaching the optimum level so that the flame at the main burner is gradually reduced prior to the time the control in the room causes the armature 140 (FIG. 4) to move to the right and thereby close the valve 132, 190 and cut off the flow of gas to the main burner, i.e., other than the gas which flows through the minimum flow passageway 198, 200 as previously described.

It is to be understood that the foregoing description and the accompanying drawings have been given only by way of illustration and example and that changes and alterations in the present disclosure which will be readily apparent to one skilled in the art are contemplated as within the scope of the present invention.

I claim:

1. The combination of:

a valve housing having an inlet adapted to be connected to a source of gaseous fuel and an outlet adapted to be connected to a main burner;

a partition within the housing dividing it into an inlet chamber and an outlet chamber, the inlet chamber being in communication with the inlet and the outlet chamber being in communication with the outlet;

an opening in the partition providing a main valve seat;

a diaphragm assembly extending across the inlet chamber to provide an exhaust chamber on the side of said assembly removed from the inlet, the assembly including a diaphragm valve for engagement with the main valve seat;

a bleed chamber having an outlet therefrom;

a passageway between the inlet chamber and the exhaust chamber terminating in a first valve seat at the exhaust chamber;

a passageway between the bleed chamber and the exhaust chamber terminating in a second valve seat at the exhaust chamber and a third valve seat at the bleed chamber;

an armature valve movable between said first and second valve seats to close off either of said passageways leading to the exhaust chamber;

a bleed valve in the bleed chamber movable between an open position away from the third valve seat and a closed position in sealing engagement therewith;

yieldable means urging the bleed valve toward the open position;

a pilot chamber containing an inlet adapted to be connected to a source of gaseous fuel;

a pilot outlet adapted to be connected to a pilot burner located adjacent the main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

means responsive to the movement of the pilot valve for maintaining the armature valve in sealing engagement with the second valve seat when the pilot valve is in the closed position and providing for free movement of the armature valve when the pilot valve is in the open position; and manually operable means for moving the exhaust valve to the closed position and the pilot valve to the open position while the pilot burner is being ignited.

2. The combination of:

a valve housing having an inlet adapted to be connected to a source of gaseous fuel and an outlet adapted to be connected to a main burner;

a partition within the housing dividing it into an inlet chamber and an outlet chamber, the inlet chamber being in communication with the inlet and the outlet chamber being in communication with the outlet;

an opening in the partition providing a main valve seat;

a diaphragm assembly extending across the inlet chamber to provide an exhaust chamber on the side of said assembly removed from the inlet, the assembly including a diaphragm valve for engagement with the main valve seat;

a bleed chamber having an outlet therefrom;

a passageway between the inlet chamber and the exhaust chamber terminating in a first valve seat at the exhaust chamber;

a passageway between the bleed chamber and the exhaust chamber terminating in a second valve seat at the exhaust chamber and a third valve seat at the bleed chamber;

an armature valve movable between said first and second valve seats to close off either of said passageways leading to the exhaust chamber;

a bleed valve in the bleed chamber movable between an open position away from the third valve seat and a closed position in sealing engagement therewith;

yieldable means urging the bleed valve toward the open position;

a pilot chamber containing an inlet adapted to be connected to a source of gaseous fuel;

a pilot outlet adapted to be connected to a pilot burner located adjacent the main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

manually operable means for moving the bleed valve to the closed position;

delayed action means responsive to the movement of the bleed valve for moving the pilot valve to the open position after the bleed valve has moved to the closed position; and means responsive to the movement of the pilot valve for maintaining the armature valve in engagement with the second valve seat when the pilot valve is in the closed position and providing for free movement of the armature valve when the pilot valve is in the open position.

3. The combination of:

a valve housing having an inlet adapted to be connected to a source of gaseous fuel and an outlet adapted to be connected to a main burner;

a partition within the housing dividing it into an inlet chamber and an outlet chamber, the inlet chamber being in communication with the inlet and the outlet chamber being in communication with the outlet;

an opening in the partition providing a main valve seat;

a diaphragm assembly extending across the inlet chamber to provide an exhaust chamber on the side of said assembly removed from the inlet, the assembly including a diaphragm valve for engagement with the main valve seat;

a bleed chamber having an outlet therefrom;

a passageway between the inlet chamber and the exhaust chamber terminating in a first valve seat at the exhaust chamber;

a passageway between the bleed chamber and the exhaust chamber terminating in a second valve seat at the exhaust chamber and a third valve seat at the bleed chamber;

an armature valve movable between said first and second valve seats to close off either of said passageways leading to the exhaust chamber;

a bleed valve in the bleed chamber movable between an open position away from the third valve seat and a closed position in sealing engagement therewith;

yieldable means urging the bleed valve toward the open position;
a pilot chamber containing an inlet adapted to be connected to a source of gaseous fuel;
a pilot outlet adapted to be connected to a pilot burner located adjacent the main burner;
a passageway between the pilot outlet and the pilot chamber terminating in a fourth valve seat at the pilot chamber;
a pilot valve in the pilot chamber movable between an open position away from the fourth valve seat with a closed position in sealing engagement therewith;
yieldable means urging the pilot valve toward the closed position;
means maintaining the pilot valve in the open position when the pilot burner is ignited;
a control button associated with the bleed valve for manually moving it to the closed position;
means responsive to the movement of the control button for moving the pilot valve to the open position after the bleed valve has been moved to the closed position; and
means responsive to the movement of the pilot valve for maintaining the armature valve in engagement with the second valve seat when the pilot valve is in the closed position and providing for free movement of the armature valve when the pilot valve is in the open position, said last-named means including a piston in engagement with the pilot valve and a rod connected to said piston and adapted to extend through said first valve seat and into engagement with the armature valve when the pilot valve is in the closed position.

4. The combination of:
a valve housing having an inlet adapted to be connected to a source of gaseous fuel and an outlet adapted to be connected to a main burner;
a cup-like partition within the housing dividing it into an inlet chamber in communication with the inlet and an outlet chamber in communication with the outlet, the interior of the cup-like partition providing an intermediate outlet chamber and the upper edge thereof providing a main valve seat;
a diaphragm assembly extending across the inlet chamber to provide an exhaust chamber on the side of said assembly removed from the inlet, the assembly including a diaphragm valve for engagement with the main valve seat;
an opening in the partition providing communication between the intermediate outlet chamber and the outlet chamber and forming a pressure regulator valve seat;
a diaphragm assembly extending across the outlet chamber to provide a vent chamber on the side thereof removed from the outlet, said vent chamber being in communication with the atmosphere;
a pressure regulator valve carried by the diaphragm assembly and movable between an open position away from the pressure regulator valve seat and a closed position in engagement therewith;
yieldable means urging the pressure regulator valve toward the open position;
a bleed chamber having an outlet therefrom;
a passageway between the inlet chamber and the exhaust chamber terminating in a first valve seat at the exhaust chamber;
a passageway between the bleed chamber and the exhaust chamber terminating in a second valve seat at the exhaust chamber and a third valve seat at the bleed chamber;
an armature valve movable between said first and second valve seats to close off either of said passageways leading to the exhaust chamber;
a bleed valve in the bleed chamber movable between an open position away from the third valve seat and a closed position in sealing engagement therewith;
yieldable means urging the bleed valve toward the open position;
a pilot chamber containing an inlet adapted to be connected to a source of gaseous fuel;
a pilot outlet adapted to be connected to a pilot burner located adjacent the main burner;
a passageway between the pilot outlet and the pilot chamber terminating in a fourth valve seat at the pilot chamber;
a pilot valve in the pilot chamber movable between an open position away from the fourth valve seat and a closed position in sealing engagement therewith;
yieldable means uring the pilot valve toward the closed position;
means maintaining the pilot valve in the open position when the pilot burner is ignited;
means responsive to the movement of the pilot valve for maintaining the armature valve in sealing engagement with the second valve seat when the pilot valve is in the closed position and providing for free movement of the armature valve when the pilot valve is in the open position; and
manually operable means for moving the exhaust valve to the closed position and the pilot valve to the open position while the pilot burner is being ignited.

5. The combination of:
a valve housing having an inlet adapted to be connected to a source of gaseous fuel and an outlet adapted to be connected to a main burner;
a cup-like partition within the housing dividing it into an inlet chamber in communication with the inlet and an outlet chamber in communication with the outlet, the interior of the cup-like partition providing an intermediate outlet chamber and the upper edge thereof providing a main valve seat;
a diaphragm assembly extending across the inlet chamber to provide an exhaust chamber on the side of said assembly removed from the inlet, the assembly including a diaphragm valve for engagement with the main valve seat;
an opening in the partition providing communication between the intermediate outlet chamber and the outlet chamber and forming a pressure regulator valve seat;
a diaphragm assembly extending across the outlet chamber to provide a vent chamber on the side thereof removed from the outlet, said vent chamber being in communication with the atmosphere;
a pressure regulator valve carried by the diaphragm assembly and movable between an open position away from the pressure regulator valve seat and a closed position in engagement therewith;
yieldable means urging the pressure regulator valve toward the open position;
a bleed chamber having an outlet therefrom;
a passageway between the inlet chamber and the exhaust chamber terminating in a first valve seat at the exhaust chamber;
a passageway between the bleed chamber and the exhaust chamber terminating in a second valve seat at the exhaust chamber and a third valve seat at the bleed chamber;
an armature valve movable between said first and second valve seats to close off either of said passageways leading to the exhaust chamber;
a bleed valve in the bleed chamber movable between an open position away from the third valve seat and a closed position in sealing engagement therewith;
yieldable means urging the bleed valve toward the open position;
a pilot chamber containing an inlet adapted to be connected to a source of gaseous fuel;
a pilot outlet adapted to be connected to a pilot burner located adjacent the main burner;

a passageway between the pilot outlet and the pilot chamber terminating in a fourth valve seat at the pilot chamber;
a pilot valve in the pilot chamber movable between an open position away from the fourth valve seat and a closed position in sealing engagement therewith;
yieldable means uriging the pilot valve toward the closed position;
means maintaining the pilot valve in the open position when the pilot burner is ignited;
manually operable means for moving the bleed valve to the closed position;
delayed action means responsive to the movement of the bleed valve for moving the pilot valve to the open position after the bleed valve has moved to the closed position; and
means responsive to the movement of the pilot valve for maintaining the armature valve in engagement with the second valve seat when the pilot valve is in the closed position and providing for free movement of the armature valve when the pilot valve is in the open position.

6. The combination of:
a valve housing having an inlet adapted to be connected to a source of gaseous fuel and an outlet adapted to be connected to a main burner;
a cup-like partition within the housing dividing it into an inlet chamber in communication with the outlet, the interior of the cup-like partition providing an intermediate outlet chamber and the upper edge thereof providing a main valve seat;
a diaphragm assembly extending across the inlet chamber to provide an exhaust chamber on the side of said assembly removed from the inlet, the assembly including a diaphragm valve for engagement with the main valve seat;
an opening in the partition providing communication between the intermediate outlet chamber and the outlet chamber and forming a pressure regulator valve seat;
a diaphragm assembly extending across the outlet chamber to provide a vent chamber on the side thereof removed from the outlet, said vent chamber being in communication with the atmosphere;
a pressure regulator valve carried by the diaphragm assembly and movable between an open position away from the pressure regulator valve seat and a closed position in engagement therewith;
yieldable means urging the pressure regulator valve toward the open position;
a bleed chamber having an outlet therefrom;
a passageway between the inlet chamber and the exhaust chamber terminating in a first valve seat at the exhaust chamber;
a passageway between the bleed chamber and the exhaust chamber terminating in a second valve seat at the exhaust chamber and a third valve seat at the bleed chamber;
an armature valve movable between said first and second valve seats to close off either of said passageways leading to the exhaust chamber;
a bleed valve in the bleed chamber movable between an open position away from the third valve seat and a closed position in sealing engagement therewith;
yieldable means urging the bleed valve toward the open position;
a pilot chamber containing an inlet adapted to be connected to a source of gaseous fuel;
a pilot outlet adapted to be connected to a pilot burner located adjacent the main burner;
a passageway between the pilot outlet and the pilot chamber terminating in a fourth valve seat at the pilot chamber;
a pilot valve in the pilot chamber movable between an open position away from the fourth valve seat and a closed position in sealing engagement therewith;
yieldable means urging the pilot valve toward the closed position;
means maintaining the pilot valve in the open position when the pilot burner is ignited;
a control button associated with the bleed valve for manually moving it to the closed position;
means responsive to the movement of the control button for moving the pilot valve to the open position after the bleed valve has been moved to the closed position; and
means responsive to the movement of the pilot valve for maintaining the armature valve in engagement with the second valve seat when the pilot valve is in the closed position and providing for free movement of the armature valve when the pilot valve is in the open position, said last-named means including a piston in engagement with the pilot valve and a rod connected to said piston and adapted to extend through said first valve seat and into engagement with the armature valve when the pilot valve is in the closed position.

7. The combination of:
a main valve housing having an inlet and an outlet;
a partition within the housing including a cup-like portion dividing it into an inlet chamber in communication with the inlet and an outlet chamber in communication with the outlet, the cup-like portion providing an intermediate outlet chamber and the upper edge thereof providing a main valve seat;
a main diaphragm assembly extending across the inlet chamber to provide an exhaust chamber on the side of said assembly removed from the inlet, the assembly including a diaphragm valve for engagement with the main valve seat;
a passageway containing valve means extending between the inlet chamber and the exhaust chamber;
an opening in the cup-like portion providing communication between the intermediate outlet chamber and the outlet chamber and forming a pressure regulator valve seat;
a pressure regulator diaphragm assembly extending across the outlet chamber and including a pressure regulator valve member movable between an open position away from the pressure regulator valve seat and a closed position in engagement therewith;
an auxiliary valve housing adjacent the pressure regulator diaphragm assembly;
a modulator diaphragm extending across the auxiliary valve housing to provide a modulation chamber between the modulator diaphragm and the pressure regulator diaphragm and a vent chamber on the other side of the modulator diaphragm assembly which is in communication with the atmosphere;
a connection between the pressure regulator diaphragm and the modulator diaphragm;
a passageway between the intermediate outlet chamber and the modulator chamber;
a modulator vent valve in communication with the modulator chamber for venting it to atmosphere responsive to selected physical conditions; and
control means for venting the exhaust chamber in the main valve housing responsive to other selected physical conditions.

8. The combination of:
a main valve housing having an inlet and an outlet;
a partition within the housing including a cup-like portion dividing it into an inlet chamber in communication with the inlet and an outlet chamber in communication with the outlet, the cup-like portion providing an intermediate outlet chamber and the upper edge thereof providing a main valve seat;

a main diaphragm assembly extending across the inlet chamber to provide an exhaust chamber on the side of said assembly removed from the inlet, the assembly including a diaphragm valve for engagement with the main valve seat;

an opening in the cup-like portion providing communication between the intermediate outlet chamber and the outlet chamber and forming a pressure regulator valve seat;

a pressure regulator diaphragm assembly extending across the outlet chamber and including a pressure regulator valve member movable between an open position away from the pressure regulator valve seat and a closed position in engagement therewith;

an auxiliary valve housing adjacent the pressure regulator diaphragm assembly;

a modulator diaphragm extending across the auxiliary valve housing to provide a modulation chamber between the modulator diaphragm and the pressure regulator diaphragm and a vent chamber on the other side of the modulator diaphragm assembly which is in communication with the atmosphere;

a connection between the pressure regulator diaphragm and the modulator diaphragm;

a passageway between the intermediate outlet chamber and the modulator chamber;

a modulator vent valve in communication with the modulator chamber for venting it to atmosphere responsive to selected physical conditions;

a bleed chamber having an outlet therefrom;

a passageway between the inlet chamber and the exhaust chamber terminating in a first valve seat at the exhaust chamber;

a passageway between the bleed chamber and the exhaust chamber terminating in a second valve seat at the exhaust chamber and a third valve seat at the bleed chamber;

an armature valve movable between said first and second valve seats to close off either of said passageways leading to the exhaust chamber;

a bleed valve in the bleed chamber movable between an open position away from the third valve seat and a closed position in sealing engagement therewith;

yieldable means urging the bleed valve toward the open position;

a pilot chamber containing an inlet adapted to be connected to a source of gaseous fuel;

a pilot outlet adapted to be connected to a pilot burner located adjacent the main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

means responsive to the movement of the pilot valve for maintaining the armature valve in sealing engagement with the second valve seat when the pilot valve is in the closed position and providing for free movement of the armature valve when the pilot valve is in the open position; and manually operable means for moving the exhaust valve to the closed position and the pilot valve to the open position while the pilot burner is being ignited.

9. The combination of:

a main valve housing having an inlet and an outlet;

a partition within the housing including a cup-like portion dividing it into an inlet chamber in communication with the inlet and an outlet chamber in communication with the outlet, the cup-like portion providing an intermediate outlet chamber and the upper edge thereof providing a main valve seat;

a main diaphragm assembly extending across the inlet chamber to provide an exhaust chamber on the side of said assembly removed from the inlet, the assembly including a diaphragm valve for engagement with the main valve seat;

an opening in the cup-like portion providing communication between the intermediate outlet chamber and the outlet chamber and forming a pressure regulator valve seat;

a pressure regulator diaphragm assembly extending across the outlet chamber and including a pressure regulator valve member movable between an open position away from the pressure regulator valve seat and a closed position in engagement therewith;

an auxiliary valve housing adjacent the pressure regulator diaphragm assembly;

a modulator diaphragm extending across the auxiliary valve housing to provide a modulation chamber between the modulator diaphragm and the pressure regultaor diaphragm and a vent chamber on the other side of the modulator diaphragm assembly which is in communication with the atmosphere;

a connection between the pressure regulator diaphragm and the modulator diaphragm;

a passageway between the intermediate outlet chamber and the modulator chamber;

a modulator vent valve in communication with the modulator chamber for venting it to atmosphere responsive to selected physical conditions;

a bleed chamber having an outlet therefrom;

a passageway between the inlet chamber and the exhaust chamber terminating in a first valve seat at the exhaust chamber;

a passageway between the bleed chamber and the exhaust chamber terminating in a second valve seat at the exhaust chamber and a third valve seat at the bleed chamber;

an armature valve movable between said first and second valve seats to close off either of said passageways leading to the exhaust chamber;

a bleed valve in the bleed chamber movable between an open position away from the third valve seat and a closed position in sealing engagement therewith;

yieldable means urging the bleed valve toward the open position;

a pilot chamber containing an inlet adapted to be connected to a source of gaseous fuel;

a pilot outlet adapted to be connected to a pilot burner located adjacent the main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

manually operable means for moving the bleed valve to the closed position;

delayed action means responsive to the movement of the bleed valve for moving the pilot valve to the open position after the bleed valve has moved to the closed position; and means responsive to the movement of the pilot valve for maintaining the armature valve in engagement with the second valve seat when the pilot valve is in the closed position and providing for free movement of the armature valve when the pilot valve is in the open position.

10. The combination of:

a main valve housing having an inlet and an outlet;

a partition within the housing including a cup-like portion dividing it into an inlet chamber in communication with the inlet and an intlet chamber in communication with the outlet, the cup-like portion providing an intermediate outlet chamber and the upper edge thereof providing a main valve seat;

a main diaphragm assembly extending across the inlet chamber to provide an exhaust chamber on the side of said assembly removed from the inlet, the assembly including a diaphragm valve for engagement with the main valve seat;

an opening in the cup-like portion providing communication between the intermediate outlet chamber and the outlet chamber and forming a pressure regulator valve seat;

a pressure regulator diaphragm assembly extending across the outlet chamber and including a pressure regulator valve member movable between an open position away from the pressure regulator valve seat and a closed position in engagement therewith;

an auxiliary valve housing adjacent the pressure regulator diaphragm assembly;

a modulator diaphragm extending across the auxiliary valve housing to provide a modulation chamber between the modulator diaphragm and the pressure regulator diaphragm and a vent chamber on the other side of the modulator diaphragm assembly which is in communication with the atmosphere;

a connection between the pressure regulator diaphragm and the modulator diaphragm;

a passageway between the intermediate outlet chamber and the modulator chamber;

a modulator vent valve in communication with the modulator chamber for venting it to atmosphere responsive to selected physical conditions;

a control housing containing a bleed chamber;

a pilot chamber in said control housing adapted to communicate with the exhaust chamber through a passageway terminating in a first valve seat at the exhaust chamber;

a passageway between the bleed chamber and the exhaust chamber terminating in a second valve seat at the exhaust chamber and a third valve seat at the bleed chamber;

an armature valve member movable between said first and second valve seats to close off from said exhaust chamber one of said passageways leading to the pilot chamber and to the bleed chamber;

a bleed valve in the bleed chamber movable between an open position away from the third valve seat and a closed position in sealing engagement therewith;

yieldable means urging the bleed valve toward the open position;

said pilot chamber containing an inlet adapted to be connected to a source of gaseous fuel;

a pilot outlet in the control housing adapted to be connected to a pilot burner located adjacent the main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

a control button associated with the bleed valve for manually moving it to the closed position;

means responsive to the movement of the control button for moving the pilot valve to the open position after the bleed valve has been moved to the closed position; and means responsive to the movement of the pilot valve for maintaining the armature valve member in engagement with the second valve seat when the pilot valve is in the closed position and providing for free movement of the armature valve when the pilot valve is in the open position, said last-named means including a piston in engagement with the pilot valve and a rod connected to said piston and adapted to extend through said first valve seat and into engagement with the armature valve when the pilot valve is in the closed position.

11. A control for use with a diaphragm valve which includes a housing, and a diaphragm member dividing the interior of the housing into an inlet chamber and an exhaust chamber, said control including:

a bleed chamber in the control having an outlet therefrom;

a passageway adapted to provide communication between the inlet chamber and the exhaust chamber and terminating in a first valve seat at the exhaust chamber;

a passageway adapted to provide communication between the bleed chamber and the exhaust chamber and terminating in a second valve seat at the exhaust chamber and a third valve seat at the bleed chamber;

an armature valve member movable between said first and second valve seats to close off either of said passageways;

a bleed valve in the bleed chamber movable between an open position away from the third valve seat and a closed position in sealing engagement therewith;

yieldable means urging the bleed control valve toward the open position;

a pilot chamber in the control containing an inlet adapted to be connected to a source of gaseous fuel;

a pilot outlet in the control adapted to be connected to a pilot burner located adjacent a main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

means responsive to the movement of the pilot valve for maintaining the armature valve member in sealing engagement with the second valve seat when the pilot valve is in the closed position and providing for free movement of the armature valve when the pilot valve is in the open position; and manually operable means for moving the bleed valve to the closed position and the pilot valve to the open position while the pilot burner is being ignited.

12. A control for use with a diaphragm valve which includes a housing, and a diaphragm member dividing the interior of the housing into an inlet chamber and an exhaust chamber, said control including:

a bleed chamber in the control having an outlet therefrom;

a passageway adapted to provide communication between the inlet chamber and the exhaust chamber and terminating in a first valve seat at the exhaust chamber;

a passageway adapted to provide communication between the bleed chamber and the exhaust chamber and terminating in a second valve seat at the exhaust chamber and a third valve seat at the bleed chamber;

an armature valve member movable between said first and second valve seats to close off either of said passageways;

a bleed valve in the bleed chamber movable between an open position away from the third valve seat and a closed position in sealing engagement therewith;

yieldable means urging the bleed valve toward the open position;

a pilot chamber in the control containing an inlet adapted to be connected to a source of gaseous fuel;

a pilot outlet in the control adapted to be connected to a pilot burner located adjacent a main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

manually operable means for moving the bleed valve to the closed position;

delayed action means responsive to the movement of the bleed valve for moving the pilot valve to the open position after the bleed valve has moved to the closed position; and means responsive to the movement of the pilot valve for maintaining the armature valve member in engagement with the second valve seat when the pilot valve is in the closed position and providing for free movement of the armature valve when the pilot valve is in the open position.

13. A control for use with a diaphragm valve which includes a housing, and a diaphragm member dividing the interior of the housing into an inlet chamber and an exhaust chamber, said control including:

a bleed chamber in the control having an outlet therefrom;

a passageway adapted to provide communication between the inlet chamber and the exhaust chamber and terminating in a first valve seat at the exhaust chamber;

a passageway adapted to provide communication between the bleed chamber and the exhaust chamber and terminating in a second valve seat at the exhaust chamber and a third valve seat at the bleed chamber;

an armature valve member movable between said first and second valve seats to close off either of said passageways;

a bleed valve in the bleed chamber movable between an open position away from the third valve seat and a closed position in sealing engagement therewith;

yieldable means urging the bleed valve toward the open position;

a pilot chamber in the control containing an inlet adapted to be connected to a source of gaseous fuel;

a pilot outlet in the control adapted to be connected to a pilot burner located adjacent a main burner;

a passageway between the pilot outlet and the pilot chamber terminating in a fourth valve seat at the pilot chamber;

a pilot valve in the pilot chamber movable between an open position away from the fourth valve seat and a closed position in sealing engagement therewith;

yieldable means urging the pilot valve toward the closed position;

means maintaining the pilot valve in the open position when the pilot burner is ignited;

a control button associated with the bleed valve for manually moving it to the closed position;

means responsive to the movement of the control button for moving the pilot valve to the open position after the bleed valve has been moved to the closed position; and means responsive to the movement of the pilot valve for maintaining the armature valve member in engagement with the second valve seat when the pilot valve is in the closed position and providing for free movement of the armature valve when the pilot valve is in the open position, said last-named means including a piston in engagement with the pilot valve and a rod connected to said piston and adatped to extend through said first valve seat and into engagement with the armature valve member when the pilot valve is in the closed position.

14. The combination of:

a valve housing having an inlet adapted to be connected to a source of gaseous fuel and an outlet adapted to be connected to a main burner;

a cup-like partition within the housing dividing it into an inlet chamber in communication with the inlet and an outlet chamber in communication with the outlet, the interior of the cup-like partition providing an intermediate outlet chamber and the upper edge thereof providing a main valve seat;

a diaphragm assembly extending across the inlet chamber to provide an exhaust chamber on the side of said assembly removed from the inlet, the assembly including a diaphragm valve for engagement with the main valve seat;

an opening in the partition providing communication between the intermediate outlet chamber and the outlet chamber and forming a pressure regulator valve seat;

a diaphragm assembly extending across the outlet chamber to provide a vent chamber on the side thereof removed from the outlet, said vent chamber being in communication with the atmosphere;

a pressure regulator valve carried by the diaphragm assembly and movable between an open position away from the pressure regulator valve seat and a closed position in engagement therewith;

yieldable means urging the pressure regulator valve toward the open position; and a minimum flow passageway between the intermediate outlet chamber and the outlet chamber.

15. The combination of:

a valve housing having an inlet adapted to be connected to a source of gaseous fuel and an outlet adapted to be connected to a main burner;

a partition within the housing dividing it into an inlet chamber and an outlet chamber, the inlet chamber being in communication with the inlet and the outlet chamber being in communication with the outlet;

an opening in the partition providing a main valve seat;

a diaphragm assembly extending across the inlet chamber to provide an exhaust chamber on the side of said assembly removed from the inlet, the assembly including a diaphragm valve for engagement with the main valve seat;

a first passageway between the inlet chamber and the exhaust chamber with first valve means controlling the flow of gaseous fuel therethrough;

a second passageway between the exhaust chamber and atmosphere with second and third spaced-apart valve means controlling the flow of gaseous fuel therethrough;

yieldable means biasing the third valve means to the open position;

a third passageway for conection between a source of gaseous fuel and a pilot burner with fourth valve means for controlling flow therethrough;

yieldable means biasing the fourth valve means to the closed position;

means maintaining the second valve means in the closed position when the fourth valve means is in the closed position;

manually operable means for moving the third valve means from the open to the closed position while the pilot burner is being ignited;

means responsive to the movement of the third valve means for moving the fourth valve means from the closed to the open position after the third valve means has moved to the closed position;

means releasably maintaining the fourth valve means in the open position so long as the temperature at the pilot burner is above a predetermined amount; and means for opening the second valve means and closing the first valve means when the fourth valve means is in the open position, responsive to predetermined physical conditions.

16. The combination of:

a valve housing having an inlet adapted to be connected to a source of gaseous fuel and an outlet adapted to be connected to a main burner;

a partition within the housing dividing it into an inlet chamber and an outlet chamber, the inlet chamber being in communication with the inlet and the outlet chamber being in communication with the outlet;

an opening in the partition providing a main valve seat;

a diaphragm assembly extending across the inlet chamber to provide an exhaust chamber on the side of said assembly removed from the inlet, the assembly including a diaphragm valve for engagement with the main valve seat;

a first passageway between the inlet chamber and the exhaust chamber with first valve means controlling the flow of gaseous fuel therethrough;

a second passageway between the exhaust chamber and atmosphere with second and third spaced-apart valve means controlling the flow of gaseous fuel therethrough;

yieldable means biasing the third valve means to the open position;

a third passageway for connection between a source of gaseous fuel and a pilot burner with fourth valve means for controlling flow therethrough;

yieldable means biasing the fourth valve means to the closed position;

means responsive to the movement of the fourth valve means for maintaining the second valve means in the closed position when the fourth valve means is in the closed position, and for moving the first valve means to the open position and the second valve means to the closed position when the fourth valve means moves from the open to the closed position as when the temperature at the pilot burner drops below a predetermined amount;

manually operable means for moving the third valve means from the open to the closed position as when the pilot burner is being ignited;

means responsive to the movement of the third valve means for moving the fourth valve means from the closed to the open position after the third valve means has been moved to the closed position;

means releasably maintaining the fourth valve means in the open position so long as the temperature at the pilot burner is above the predetermined amount; and means for opening the second valve means and closing the first valve means when the fourth valve means is in the open position, responsive to predetermined physical conditions.

17. A control for use with a diaphragm valve which includes a housing, and a diaphragm valve member dividing the interior of the housing into an inlet chamber and an exhaust chamber, said control including:

a first passageway adapted to provide communication between the inlet chamber and the exhaust chamber with first valve means therein for controlling the flow of a gaseous fuel therethrough;

a second passageway adapted to provide communication between the exhaust chamber and atmosphere with second and third spaced-apart valve means therein for controlling the flow of gaseous fuel therethrough;

yieldable means biasing the third valve means to the open position;

a third passageway adapted to provide communication between a source of gaseous fuel and a pilot burner with fourth valve means therein for controlling flow therethrough;

yieldable means biasing the fourth valve means to the closed position;

means maintaining the second valve means in the closed position when the fourth valve means is in the closed position;

manually operable means for moving the third valve means from the open to the closed position as when the pilot burner is to be ignited;

means responsive to the movement of the third valve means for moving the fourth valve means from the closed to the open position after the third valve means has moved to the closed position;

means for releasably maintaining the fourth valve means in the open position so long as the temperature at the pilot burner is above a predetermined amount; and means for opening the second valve means and closing the first valve means when the fourth valve means is in the open positon, responsive to predetermined physical conditions.

18. A control for use with a diaphragm valve which includes a housing, and a diaphragm valve member dividing the interior of the housing into an inlet chamber and an exhaust chamber, said control including:

a first passageway adapted to provide communication between the inlet chamber and the exhaust chamber with first valve means therein for controlling the flow of a gaseous fuel therethrough;

a second passageway adapted to provide communication between the exhaust chamber and atmosphere with second and third spaced-apart valve means therein for controlling the flow of gaseous fuel therethrough;

yieldable means biasing the third valve means to the open position;

a third passageway adapted to provide communication between a source of gaseous fuel and a pilot burner with fourth valve means therein for controlling flow therethrough;

yieldable means biasing the fourth valve means to the closed position;

means responsive to the movement of the fourth valve means for maintaining the second valve means in the closed position when the fourth valve means is in the closed position, and for moving the first valve means to the open position and the second valve means to the closed positon when the fourth valve means moves from the open to the closed position as when the temperature at the pilot burner drops below a predetermined amount;

manually operable means for moving the third valve means from the open to the closed position as when the pilot burner is being ignited;

means responsive to the movement of the third valve means for moving the fourth valve means from the closed to the open position after the third valve means has been moved to the closed position;

means releasably maintaining the fourth valve means in the open position so long as the temperature at the pilot burner is above the predetermined amount; and means for opening the second valve means and closing the first valve means when the fourth valve means is in the open position, responsive to predetermined physical conditions.

(References on following page)

References Cited by the Examiner

UNITED STATES PATENTS

| | | | |
|---|---|---|---|
| 2,273,127 | 2/42 | McGoldrick et al. | 158—130 X |
| 2,361,632 | 10/44 | Jones | 236—80 |
| 2,372,564 | 3/45 | Engholdt | 236—80 X |
| 2,661,013 | 12/53 | Eskin et al. | 236—80 X |
| 2,729,285 | 1/56 | Ray | 158—129 |
| 2,872,972 | 2/59 | Matthews | 158—129 |
| 2,905,389 | 9/59 | Eskin | 236—92 |

EDWARD J. MICHAEL, *Primary Examiner.*

UNITED STATES PATENT OFFICE
CERTIFICATE OF CORRECTION

Patent No. 3,182,713            May 11, 1965

Walter S. Lee

It is hereby certified that error appears in the above numbered patent requiring correction and that the said Letters Patent should read as corrected below.

Column 5, line 67, strike out "and"; column 13, line 12, for "with" read -- and --; column 19, line 3, for "intlet" read -- outlet --; column 20, line 30, strike out "control".

Signed and sealed this 28th day of September 1965.

(SEAL)
Attest:

ERNEST W. SWIDER
Attesting Officer

EDWARD J. BRENNER
Commissioner of Patents